Figure 1:
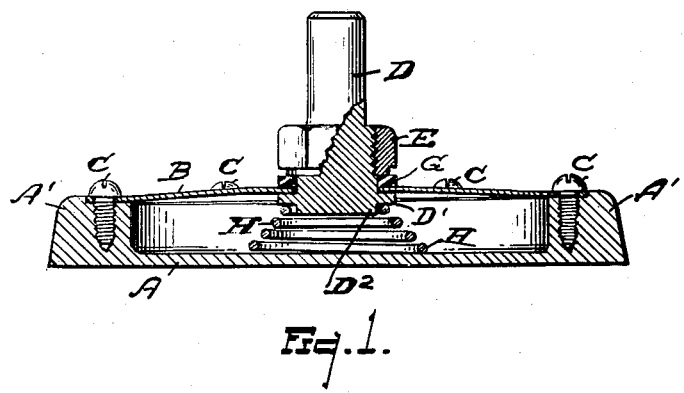

March 6, 1945.   H. J. BERRY   2,371,021
ROTATABLE SANDING OR BUFFING TOOL
Filed July 25, 1944

Inventor
Henry J. Berry
By
J. C. Thomas
Attorney

Patented Mar. 6, 1945

2,371,021

UNITED STATES PATENT OFFICE 2,371,021

ROTATABLE SANDING OR BUFFING TOOL

Henry J. Berry, Detroit, Mich.

Application July 25, 1944, Serial No. 546,481

2 Claims. (Cl. 51—197)

My invention relates to a rotatable sanding or buffing tool, shown in the accompanying drawing and more particularly described in the following specification and claims.

In the drawing:

Figure 1 is a vertical cross-sectional view of a rotatable sanding or buffing tool—embodying a yieldable disc-plate secured to an annular upstanding flange on the back of the surfacing or work-contacting plate of the tool—a spring being located between the inner face of the work-contacting plate and a projecting circular flange integral with the driving shaft, on which the yieldable disc is centrally disposed and secured by a "left-hand" screw-threaded nut on the driving shaft—which upon adjustment bears upon a flexible washer between the nut and disc.

Figure 2:
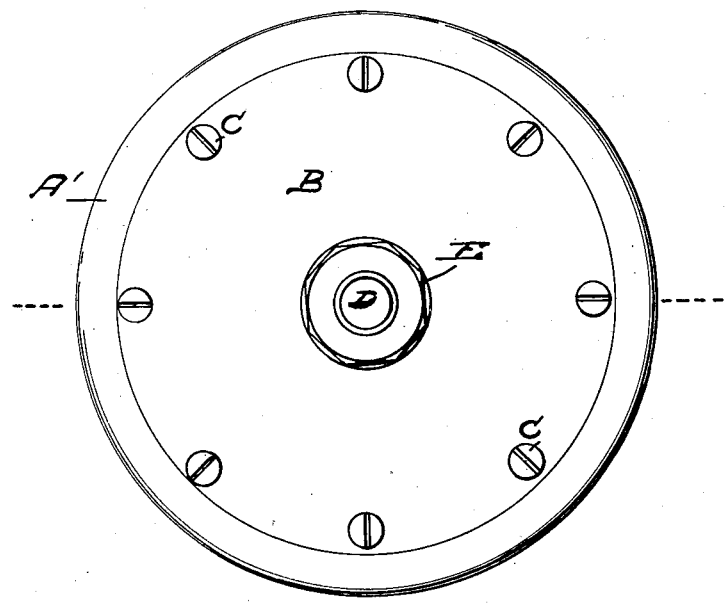

Figure 2 is a plan view of the tool, showing its disc-plate secured by a plurality of screws to an upstanding outer rim or flange of the surfacing or work-contacting plate of the tool.

Referring now to the letters of reference on the drawing, indicating the several parts:

A denotes a surfacing or work-contacting plate to which an abrasive element (not shown) is applied.

B indicates a metallic disc, secured by screws C, to an upstanding outer rim or flange A' on the surfacing or work-contacting plate A, of the tool. D denotes a relatively short shaft, adapted to be connected to a driving shaft—or to the spindle of a drill-press (not shown).

The shaft D is screw-threaded to receive a left-hand screw-threaded nut E, and extends through a central aperture in the metallic disc B, which overlaps the circular flange D'—integral with the shaft D.

Sleeved on the shaft D, above the disc B, is a flexible washer G, against which the nut E, may be adjusted to secure the disc to the shaft D. Located centrally below the shaft D, and bearing upon the inner face of the work contacting plate A, is a cone-shaped spring H, which at its upper end engages the underside of the annular flange D' projecting from the shaft D—the shaft having an extended end portion D2, to receive the upper end of the spring H, to secure the spring against accidental displacement. The cone-shaped spring H, coordinates with the flexible disc B, attached to the flange A' of the surfacing or work contacting plate A, of the tool—and as a result of their combined action a highly finished surface is obtained—due to the work-contacting plate A, automatically adjusting itself to any irregularities that may occur in the surface of the work being finished—without any preliminary adjustment of the parts being necessary—so frequently required by other surfacing tools.

What I claim is:

1. A device of the character described, comprising a work-contacting plate; a disc secured to the rim of said plate; a power-driven shaft, adapted to rotate the plate extending through an opening in the disc, having a flange to receive the overlapping wall of the disc surrounding said opening; a washer sleeved on the shaft overlaying the opposite side of the disc; a nut having a screw-threaded connection with the shaft, adapted upon adjustment to force the washer into engagement with the wall of the disc; and a coiled spring encircling the end of the shaft and seated against its projecting flange, its opposite end bearing against the inner face of the work-contacting plate.

2. In a device of the character described, a work-contacting plate; a flexible disc secured to an integral rim extending outwardly from the work-contacting plate; a shaft adapted for connection with power driven means, extending through an opening in said disc—having a flange to receive the wall of the disc; a washer sleeved on said shaft overlaying the opposite side of the disc; a nut having a screw-threaded connection with the shaft, adapted to force the washer into engagement with the disc; and a cone-shaped coiled spring encircling said shaft at the top of the spring and bearing against the projecting flange, and at the bottom against the inner face of the work-contacting plate.

HENRY J. BERRY.